United States Patent [19]

Lorenz

[11] Patent Number: 4,708,483
[45] Date of Patent: Nov. 24, 1987

[54] OPTICAL MEASURING APPARATUS AND METHOD

[75] Inventor: Robert D. Lorenz, Madison, Wis.
[73] Assignee: Rexnord Inc., Brookfield, Wis.
[21] Appl. No.: 750,348
[22] Filed: Jun. 28, 1985
[51] Int. Cl.⁴ .............................................. G01B 11/14
[52] U.S. Cl. ...................................... 356/376; 356/1; 356/375
[58] Field of Search ........................... 356/376, 375, 1

[56] References Cited

U.S. PATENT DOCUMENTS 4,541,723 9/1985 Pirlet .................................. 356/376
4,575,237 5/1986 Suzuki ..................................... 356/1

FOREIGN PATENT DOCUMENTS 0006821 1/1985 Japan .................................... 356/375

Primary Examiner—R. A. Rosenberger
Assistant Examiner—Crystal D. Cooper
Attorney, Agent, or Firm—Richard C. Ruppin

[57] ABSTRACT

An optical triangulation probe is provided for measuring the distance and inclination of a surface. A light source is utilized for projecting a beam toward the surface to form a light spot on the surface. The image of the light spot is reflected and formed on a light detector means which produces a signal representation of the image intensity distribution of the light spot image and the location of the image on the detector means. Estimating means utilizes the signal representation of the light spot image and a signal representation of a theoretical image to estimate the location of the light spot image on the detector means. The distance of the surface and its inclination as established upon making the estimation due to the known triangulation relationship between the location of the light spot image on the detector means and the location of the light spot on the surface.

45 Claims, 28 Drawing Figures

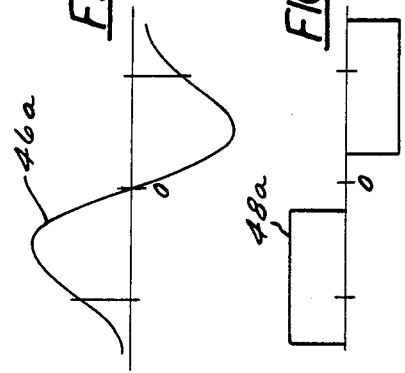 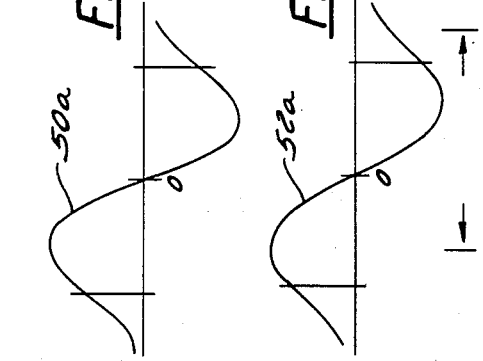
FIG. 6E  FIG. 6F  FIG. 6G  FIG. 6H
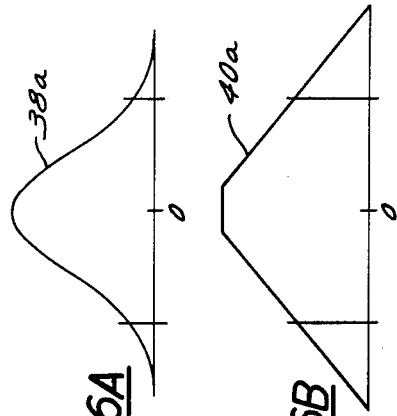 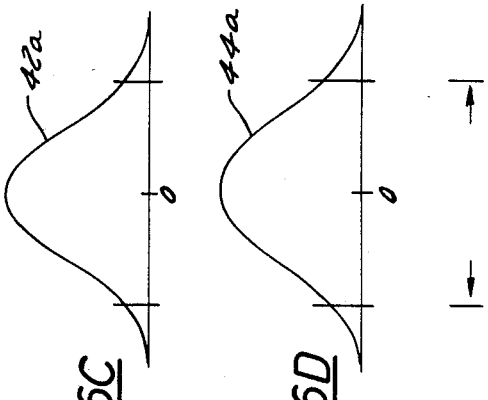
FIG. 6A  FIG. 6B  FIG. 6C  FIG. 6D
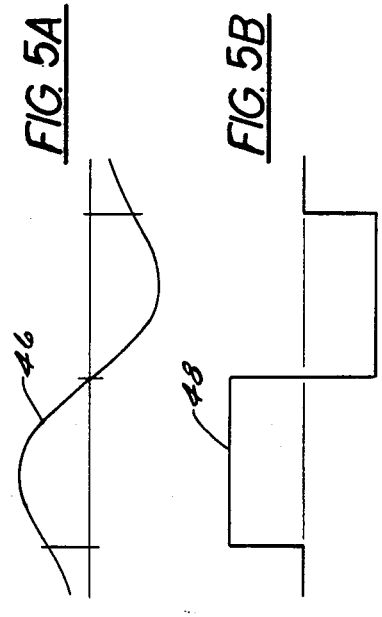 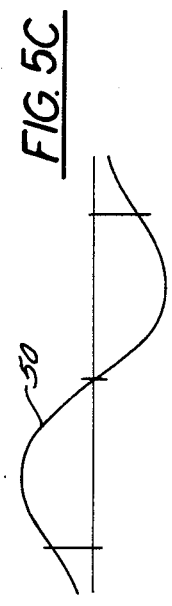 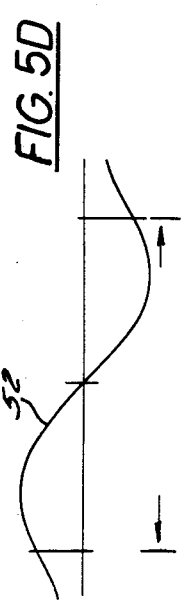
FIG. 5A  FIG. 5B  FIG. 5C  FIG. 5D

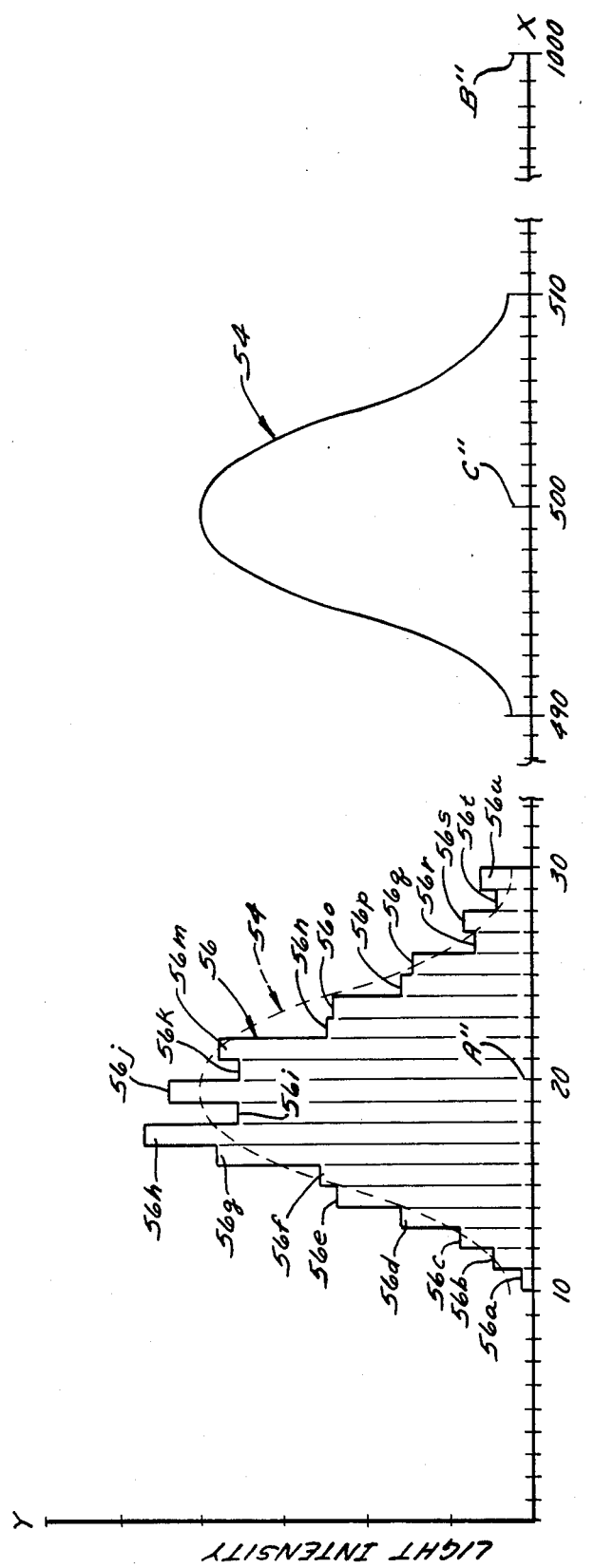

OPTICAL MEASURING APPARATUS AND METHOD

This invention relates to an optical triangulation apparatus and method and more particularly to a method and apparatus producing a light spot image shape having known characteristics and utilizing the known characteristics to accurately estimate the location of the light spot image shape to measure an article.

BACKGROUND OF THE INVENTION

Devices and methods for gauging and measuring manufactured articles for purposes of determining whether they meet quality, dimension and other requirements are well known. However, in view of the present day movement toward increased manufacturing efficiency and speed, there is a need for improved part inspection technology that is well beyond what is presently available. In a machine tool industry investigation which produced the "Report of the Machine Tool Task Force", 1980 Volume 5, Page 82, it is stated that there is a need for "higher speed machines which bring metrology up to machining in terms of inspection time."

The well-known mechanical contacting probe is a current measuring technique which is both slow and relatively inflexible in its application. Of the potential alternative replacement technologies for the mechanical contacting probe, opto-electronic techniques are currently receiving the most attention. The primary reasons for this selection appears to be the advent of economical laser sources and solid state imaging devices and the inherent speed of opto-electronic devices. Furthermore, the various optical techniques are capable of measuring a wide range of materials and can provide high resolution while closely approximating the point measurement capability of mechanical probes.

Some optical/electronic technologies with potential part measurement use include vision approaches such as 2-D cameras and digital image processing, optical image processing, null tracking optical scanners, interferometry, ray optics edge detection scanning, Fourier optics processing, and ray optics triangulation. Current research in vision application areas focuses on part identification, part inspection, and machine guidance. Vision systems utilize relatively large photodiode arrays that provide data requiring a substantial amount of signal processing. Computation intensive algorithms are required and the overall result is that current vision approaches have slow processing speeds and poor range/resolution ratios unless very large photodiode arrays are utilized which, in turn, exacerbates the processing speed problems. In optical imaging systems, the image intensity distribution is focused on an appropriate "matched" filter plate which results in an intensity distribution "product" behind the filter. The amplitude of the final projection "product" represents the amplitude of a cross correlation double integral which can be used to identify the pattern or shape of the image projected onto the filter plate. Optical image processing has the problems of requiring substantial data processing because a whole surface image is produced and limitation to dedicated applications due to the requirement of a holographic plate for each shape to be inspected. Null tracking techniques using optical probes are relatively simple and of fast response within their limited range. However, their dynamic range limitation requires either slowly changing surfaces or slow traverse rates for measurements. Interferometry is very fast and has practically unlimited range for part measurements, however, the technique inherently produces path length errors due to surface roughness of the part being measured. Ray optics edge detection techniques are based on measurement of the shadow produced by part edges when illuminated from a point source. Edge detection is fast, inexpensive, high in both range and resolution and insensitive to surface scatter with proper beam size and signal processing. However, edge detection is limited to only those situations in which the surfaces being inspected produce shadows and therefore lacks the flexibility for general part inspection methods. Recent work in optical Fourier transform techniques for part measurement have been either in optical pattern recognition or in surface roughness measurement. In these efforts, primary emphasis has been placed on higher spatial frequencies more useful in determining part roughness than the geometry of a part. However, with further development, it is anticipated that optic Fourier transform theory will have application to part geometry measurement.

Of the various optical/electronic measurement device alternatives, ray optics triangulation is the most similar to the conventional mechanical contacting probe. In a probe utilizing ray optics triangulation, the location of the intersection of a focused light beam with a part surface is measured. This approach treats light beams as rays, ignoring wave properties of the light, and relies on position detection photosensors. In the mid-1970s, suitable silicon photodetector devices appeared and led to the development of a number of part measurement devices of the optical triangulation type. A relatively early device of this type was a null tracking optical triangulation sensor for in process measurement of turned parts. This device achieved a resolution to 0.0001 inches, but was greatly limited in its usefulness by the null tracking feature. Also at a relatively early time, Diffracto Ltd. developed a more general probe system for use in inspecting turbine blade profiles. The Diffracto device was based on an optical triangulation probe using a linear array of photodiodes. The probe had a limited range of ±0.020 inches but had a theoretical resolution of 20 microinches. A serious drawback of the probe was its limited range. The Diffracto probe also included a method of measuring surfaces without maintaining a particular orientation to the surface normal. The system used two symmetrically located photodetector arrays positioned on either side of the incident light beam on the surface so that if the surface inclined toward either of the two photodetector arrays, that array would receive a higher level of light intensity and would be selected as the array to read for measurement purposes. Another optical triangulation probe development, at Case Western Reserve University, scanned the part using a rotating mirror scanner and measured the angular location of the specular peak. This approach was configured to sense only the single peak. The foregoing and other initial efforts in the optical triangulation probe development area utilized a variety of signal processing approaches including analog peak detector networks, digital first moment calculations, and serial digital signal processing.

In all of the currently developed optical measuring probes, there is no provision for both high resolution and acceptable range for high speed part measurement systems. Moreover, speed of data analysis is unsatisfactory, particularly for systems possessing high range-toresolution ratio. The probe orientations of all currently developed optical probes are limited to near normal and do not provide for probe orientation to accommodate varying inclination of the surface being measured. It is a consequent object of this invention to provide an optical triangulation measuring probe apparatus and a method for optically measuring the inclination and displacement of workpiece or part surfaces having a high range-to-resolution ratio in the measurements, a high speed measurement capability, and flexibility in handling a variety of shapes and parts. It is also an object of the invention to provide a measuring probe apparatus and method in which displacement as well as inclination of a workpiece surface can be measured with the apparatus and as part of the method.

SUMMARY OF THE INVENTION

The invention is accomplished by providing an apparatus including a means for projecting a beam of light toward a workpiece surface which is to be measured to form a light spot on the surface. The light reflected from the surface impinges on a light detector means to form an actual light spot image on a light receiving surface of the detector means. In response to the energy of the light spot image, the detector produces a plurality of signals representative of the intensity distribution of the actual light spot image and the location of the image on the detector means. Estimating means is provided and contains a signal representation of a reference or theoretical desired light spot intensity image shape and a reference location of the shape. The estimating means receives the signals representative of the intensity distribution of the actual light spot image shape and identifies a spatially coinciding location of the signal representation of the theoretical desired light spot intensity image shape and the plurality of signals representative of the known intensity distribution of the actual light spot image shape. The coinciding location can be identified from the reference location of the theoretical desired image shape. The position of the actual light spot image shape on the detector means varies with the distance of the surface on the basis of well-known triangulation principles so that the identifying of a coinciding location of the signal representation of the theoretical desired light spot image shape and the signal representation of the actual light spot image shape identifies the distance of the surface.

A memory data base may be used to store the signal representation of the intensity distribution of the theoretical desired light spot image shape and a reference spatial location of the theoretical desired light spot image shape which corresponds to a reference position of the workpiece surface. The estimating means calculates the cross correlation function of the theoretical desired light spot image shape and the actual light spot image shape at the reference spatial location and at additional spatial locations until the peak value of the cross correlation function is obtained, thus providing an estimate that the two image shapes are in coincidence. The estimating means then also identifies the distance between the theoretical desired light spot image shape reference spatial location on the detection means and the spatial location at which the peak value of the cross correlation function is calculated. This distance is representative of the displacement of the workpiece surface from its reference position.

The actual light spot image shape and the theoretical desired light spot image shape, as represented by a signal representation, are both preferably of the same shape and same size. It should be understood, however, that the actual light spot image shape may be substantially distorted by various types of noise. Both image shapes are also such that they preferably contribute to the unimodal character of the cross correlation function calculated from the functions of the image shapes.

The detector means preferably comprises a photodiode array in which each of a plurality of photodiodes produces a signal having a spatial width of the diode and an amplitude representing a portion of the intensity distribution of the actual light spot image shape. The signal representation of the theoretical desired light spot image shape comprises a plurality of signals each having a width which may be equal to the width of one diode and an amplitude based on that of the actual light spot image shape. In estimating the location of the actual light spot, the cross correlation function of the actual light spot image shape and the theoretical desired light spot image shape may be initially calculated at relatively coarse increments in movement of the theoretical desired light spot image such as one photodiode width. At a location where relatively large cross correlation function values are being obtained, calculations can be made at incremental movements of the theoretical desired light spot image signal representation of a fraction of a diode width. Since, at each of the fractional increments, each of the signals of the signal representation of the theoretical desired light spot image shape has a unique value, the corresponding cross correlation calculations will each have a uniquely identifiable value permitting estimation of the location of the actual light spot image shape to a resolution level less than the width of each photodiode of the array. As a result, the displacement of the surface to be measured can be determined to a resolution level independent of the widths of the photodiodes and substantially finer than the width of the photodiode.

BRIEF DESCRIPTION OF THE DRAWINGS

Further objects and advantages of the invention will appear when taken in conjunction with the accompanying drawings in which:

FIGS. 5A, 5B, 5C and 5D illustrate the cross correlation slope functions of the cross correlation function shapes shown in FIGS. 4A-D;

FIGS. 6A, 6B, 6C, 6D, 6E, 6F, 6G and 6F are cross correlation functions and cross correlation slope function shapes for the four image shapes illustrated in FIGS. 3A-D;

FIG. 7 illustrates an actual light image shape and a theoretical desired light image shape plotted on common coordinate axes;

DESCRIPTION OF THE PREFERRED EMBODIMENT

Figure 1:
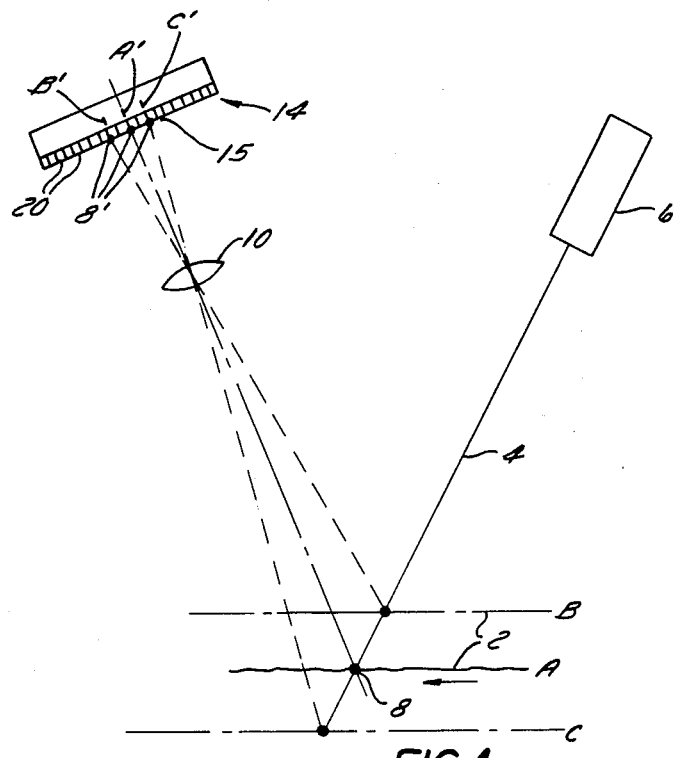
FIG. 1 illustrates schematically the components that comprise the optical portion of the apparatus of the present invention.
Figure 2:
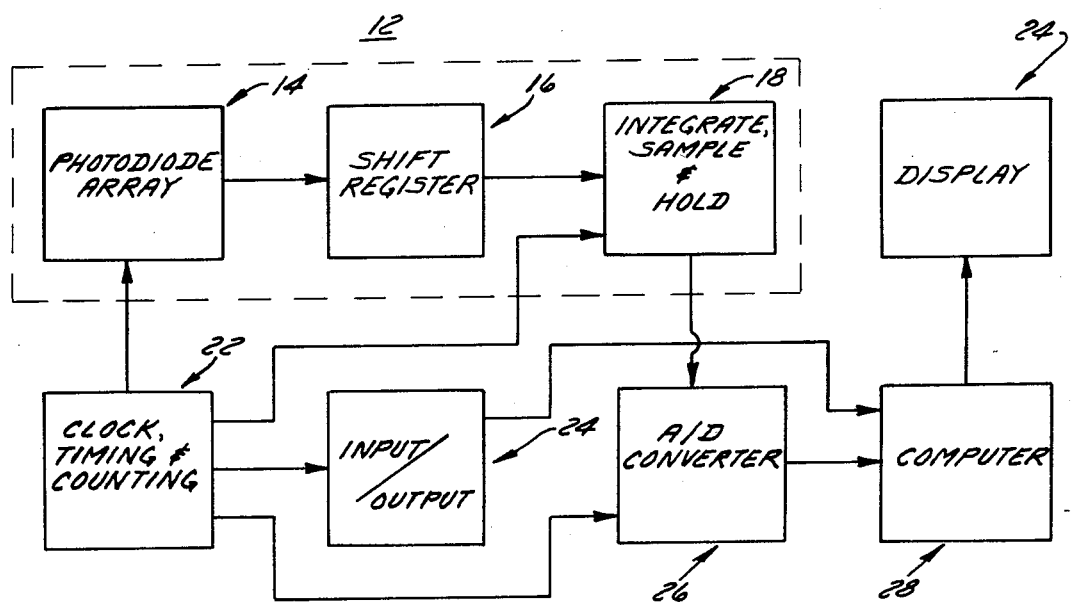
FIG. 2 is a schematic block diagram illustrating electronic circuit components of the invention.
Figure 4A:
FIGS. 4A, 4B, 4C and 4D illustrate the cross correlation function for the functions of the image shapes shown in FIGS. 3A-D.
Figure 4B:
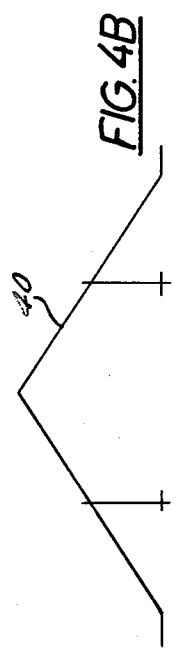
Figure 4C:
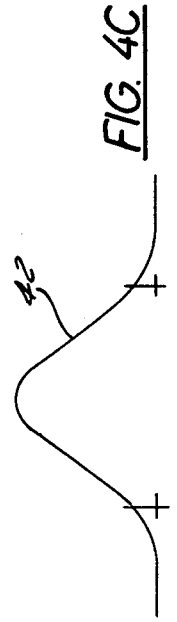
Figure 4D:
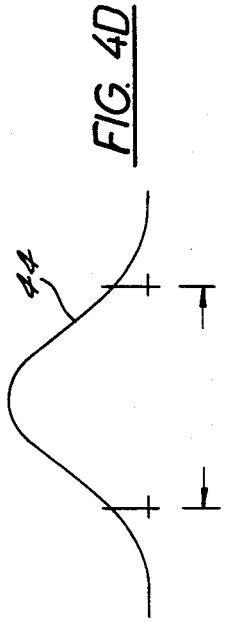
Figure 3A:
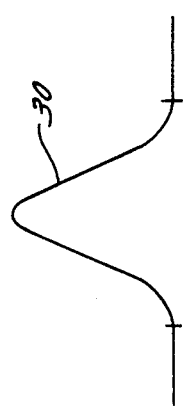
FIGS. 3A, 3B, 3C and 3D, respectively, illustrate four different light image shapes suitable for use in the present invention.
Figure 3B:
Figure 3C:
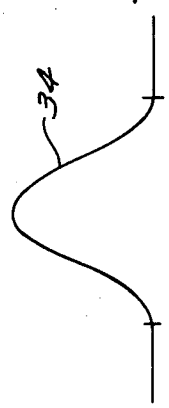
Figure 3D:
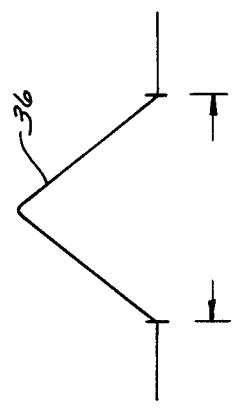

With reference to FIGS. 1 and 2, an optical measuring probe apparatus is shown in which the surface 2 of a workpiece is positioned in the path of a substantially collimated or minimum divergence beam of light 4. The beam 4 is preferably of a predetermined known specific intensity shape and may typically be provided by a laser means 6. The workpiece may be mounted on a machine (not shown) and moved by the machine into the path of the light beam 4 or the workpiece may be held stationary by the machine and the optical measuring probe moved to thereby move the light beam 4 over the surface 2 of the workpiece. Either arrangement may be used, but for purposes of the description of the invention herein, the surface 2 will be considered to move in the direction of the arrow in FIG. 1 into the path of the light beam 4. The work surface 2 will vary in its displacement transverse to its direction of movement and in the direction of the light beam 4. In FIG. 1, the surface 2 is shown as a solid line at a position A which may be considered to be a reference position. Phantom lines B and C represent the displaced positions which the surface 2 may follow on either side of reference position A. For illustration purposes herein, positions B and C may be considered to represent the range about position A over which the optical measuring probe can measure the displacement of the surface 2 with acceptable resolution.

The laser means 6 may, for example, be of a helium/neon type with a Gaussian intensity distribution and a nominal beam width of 0.020 inches. The beam of light 4 from the laser means 6 is projected onto the surface 2 to form a light spot 8 on the surface 2 at its position A. The spot on the surface 2 is imaged by an imaging lens 10 as light spot image 8' onto a photodiode array 14 of a detector means 12. As shown in FIG. 1, a triangulation arrangement is utilized in which the illumination beam 4 and the optical axis 11 of the imaging lens 10 intersect and form a triangulation plane. The diode array 14 is located behind the lens 10 in the triangulation plane and normal to the optical axis 11 of the lens 10. Further, the photodiode array 14 is positioned such that the image 8' of the light spot 8 is in the image plane of the lens 10 when the surface 2 is positioned at the intersection of the light beam 4 and the lens optical axis 11. At this location of position A of the surface 2 as shown in FIG. 1, the surface 2 is considered to be at the optical null of the measuring apparatus and thus the location of the image 8' at position A' on the diode array 14 corresponds to and identifies the null position of the probe. As the surface 2 moves or is displaced along the length of the light beam 4 to locations such as positions B and C in FIG. 1, the image 8' on the diode array 14 of the light spot 8 will correspondingly move to new positions B' or C' on the diode array 14 where the images are identified respectively as light spot images $8'_B$ and $8'_C$. The location of the light spot images $8'_B$ and $8'_C$ on the photodiode array 14 thus also correspond to and identify the displacement range which the probe is to measure. The movement distance of the light spot image on the photodiode array 14 has a known relationship to the displacement or inclination movement of the surface 2 based on well-known triangulation principles. These principles permit the calculation of the surface displacement using the estimation of the location of the light image on the photodiode array 14 relative to a reference location and the calculation of surface inclination using the estimation of the distance between two light images on the photodiode array.

The photodiode array 14 most suitably should have approximately 1,000 individual photodiodes 20 arranged in linear juxtaposition and be about 1 inch in length. With these dimensions, the width of each individual diode 20 would be approximately 0.001 inches. Each diode 20 produces a photoinduced current as a result of the light flux impinging on a light receiving surface 15 of the diode array 14 which is stored as a capacitive charge of each of the diode elements. As a whole, then, the photodiode array 14 produces a signal representation of the light image intensity distribution of the light spot image 8' as it is imaged on the photodiode array 14 to the extent of the image width received by the array 14. Thus, if the light spot image 8' on the photodiode array 14 has a width of 0.015 inches and the diodes 20 are each 0.001 inches wide, the image of the light spot 8' would have a width of 15 diodes. In addition to the photodiode array 14, the detector means 12 includes an electronic means to read out the image intensity distribution such as a shift register 16 and an integrate, sample and hold circuit 18. The shift register 16 which, for example, may comprise a CCD (charge coupled device) connected to the odd diodes 20 of the photodiode array 14 and a separate CCD connected to the even numbered diodes 20, is used to read out the photodiode capacitance charge. The integrate, sample and hold circuit 18, connected to the shift register 16, includes an MOS integrator to transform each accumulated charge from the shift register 16 into a voltage, and a sample and hold amplifier. A clock, timing and counting circuit 22 is connected to the photodiode array 14, the circuit 18, and the analog to digital converter 26 to provide clocking for transferring charges from the diodes 20 to the circuit 18, recharging each photodiode capacitance, and synchronizing the circuits to which it is connected. The A/D converter 26 receives the voltage signals representative of the light intensity values received by each diode and converts each analog voltage signal to digital signals and transfers the digital signals to the computer 28.

The computer 28 includes a memory base in which the digital signals representative of the light intensity distribution of the actual light image shape are stored and in which signals representative of the light intensity distribution of a theoretical desired light image shape may also be stored. The computer 28 also includes a central processing unit which is programmed to calculate the cross correlation function of the actual light spot image shape 8' and the theoretical light image shape using the signal representations of the two shapes as will be discussed in greater detail hereinafter. The computer 28 may be considered to be an estimating means with respect to its function in calculating or determining locations of light image shapes. The computer 28 has an output to an indicating device 24 for providing an indication of the displacement of the surface 2 as calculated by the computer 28. The indicating device 24 may, for example, be of a visual type or may cause the operation of an associated device (not shown) to retain or reject the workpiece.

In measuring the displacement of a surface such as workpiece surface 2 with an optical measuring probe utilizing triangulation principles, spatial position estimation of the illumination spot image from the surface can be quite useful in obtaining high resolution and a wide measuring range. In performing spatial position estimation to locate the image of a light spot, at least several approaches may be followed, including centroid calculation, simple peak detection, and cross correlation calculation. However, it has been found that, because cross correlation theory utilizes the known characteristics of the image shape which is to be located, cross correlation in position estimation is the most effective approach and therefore it is the preferred approach in the apparatus and method of the present invention.

Figure 12:
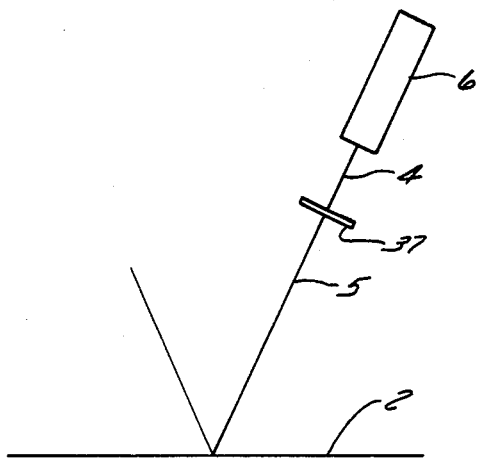
FIG. 12 illustrates schematically the components of another alternate embodiment of the invention.

Because the shape of the image which is being located affects the accuracy of the location estimation, selection of a particular range independent image shape and utilization of the known characteristics of that shape is an important factor in making the estimation and thus in accomplishing the measurement of the displacement of the surface from which the image is reflected. There are a number of image shape criteria which determine the suitability of an image shape for use in location estimation. One of these criteria is that the image should have a shape such that the cross correlation function calculated from the image should be unimodal in character, that is, it should have a single peak. Furthermore, where the cross correlation function is calculated, as in the present invention, from an actual light spot image and a theoretical desired light spot image, the shapes of both images should be such that they both contribute to the unimodal nature of the cross correlation function. The underlying reason for the unimodal requirement is that estimating the location of the image shape requires that the peak value of the cross correlation function of the image shape be accurately identified. More than one cross correlation peak value or ambiguity in that value would result in corresponding ambiguity in the location of the image shape. Referring now to FIGS. 3A, 3B, 3C and 3D, respectively, there are shown four different light intensity distribution image shapes, a Gaussian shape 30, a circular shape 32, a cosine shape 34 and a triangle shape 36, all of which meet the unimodal shape requirement. The circular shape 32 is obtained by utilizing only a small, central area of a relatively large diameter illumination beam such that the light intensity amplitude across the entire width of the circular image is relatively constant. The Gaussian shape is the naturally occurring image shape produced by a single spatial mode laser such as a helium/neon laser. The cosine and triangle image shapes may be generated by a technique such as projecting an illumination beam through an optical mask. With reference to FIG. 12, a light source such as laser 6 is shown projecting a beam of light 4 through an optical mask 37. The mask 37 modifies the intensity distribution shape of the beam 4 to produce a light beam 5 having a different desired intensity distribution image. In addition to meeting shape characteristics criteria, it is also preferred that the image shapes of the actual and reference or theoretical image shapes be of the same type and equal in size.

A further type of criteria which light image shapes must meet in order to be usable in estimating their location is their sensitivity to noise, including systematic noise such as image shape errors which may occur due to causes such as misfocus and lens aberration, amplitude errors, and photodiode clipping error due to saturation. The image shapes as shown in FIGS. 3A, 3B, 3C and 3D can be best evaluated for noise sensitivity purposes by considering their cross correlation functions and cross correlation slope functions. The cross correlation functions and the cross correlation slope functions of the image shapes shown in FIGS. 3A, 3B, 3C and 3D are respectively shown in FIGS. 4A, 4B, 4C and 4D and 5A, 5B, 5C and 5D. In FIGS. 4A, 4B, 4C and 4D, the Gaussian, circular, cosine and triangular cross correlation functions are respectively identified by the numerals 38, 40, 42 and 44. In FIGS. 5A, 5B, 5C and 5D, the slope of the cross correlation functions respectively shown in FIGS. 4A, 4B, 4C and 4D for the Gaussian, circular, cosine and triangle image shapes are respectively identified by the numerals 46, 48, 50 and 52. With reference to FIGS. 5A, 5B, 5C and 5D, it can be seen that the cross correlation slope functions provide clear identity of the peak and zero crossing locations of the cross correlation functions. However, with reference to FIGS. 6A, 6B, 6C and 6D, in which the Gaussian, circular, cosine and triangle image shape cross correlation functions are respectively defined by the numerals 38a, 40a, 42a and 44a and FIGS. 6E, 6F, 6G and 6H in which the corresponding cross correlation slope functions of the Gaussian, circular, cosine and triangle image shapes are respectively defined by the numerals 46a, 48a, 50a and 52a, the cross correlation slope functions are shown with a 20% image width error and it can be seen that the circular cross correlation slope function has degraded such that the peak value of its cross correlation function and the zero crossing of its cross correlation slope function are no longer uniquely defined. For this reason, the circular image shape is not considered as a preferred shape in the present invention. Although the other three image shape functions have shifted somewhat in the locations of their cross correlation functions, there is little change in the zero crossings of their cross correlation slope functions and peak values of their cross correlation functions due to image width errors.

With respect to the Gaussian, cosine and triangle image shapes, an analysis was made of the efficiency and consistency of their cross correlation functions at various levels of image width errors. Also, an analysis was made of the efficiency and consistency of their cross correlation functions in the presence of image amplitude clipping due to photodiode saturation. The results in the image width error analysis indicated that location error between the cross correlation functions calculated from each of the three shapes was small but that the cross correlation functions calculated from the Gaussian and cosine image shape functions have slightly less error overall. With respect to the saturation error analysis, it was found that the cross correlation function location error of each of the three image shapes was slight and that the absolute differences in the cross correlation function location error resulting from each of the three shapes was quite small.

The Gaussian, cosine and triangle image shape functions were also evaluated for use in cross correlation location estimation with respect to signal processing aspects. It was found that both the Gaussian and triangle image shape functions resulted in a recursive calculation form requiring a relatively low number of computations. As between the Gaussian and triangle shapes, the triangle shape was particularly computationally efficient. The cosine image shape did not result in a recursive form for calculating the desired image shape function and thus required longer calculation times than either the Gaussian or triangle functions. An analysis was also made of processing time with respect to noise attenuation using each of the three Gaussian, cosine and triangle shape. The analysis indicated that the relative differences in cross correlation function location error between the Gaussian, cosine and triangle shapes were small for conditions both with and without systematic noise error. Further, it was found with all three image shapes that systematic shape errors due to noise are best attenuated by increasing image size.

On the basis of the foregoing analyses, the Gaussian image shape is the preferred shape for use in the present invention. From a noise attenuation perspective, the triangular image shape is slightly inferior to the Gaussian and cosine shapes. However, the triangular image shape, from a signal processing point of view, is preferred with a Gaussian image function only moderately less desirable. The non-recursive form of the cosine shape function makes it least desirable for signal processing purposes. Both the triangular image shape and the cosine image shape require formation with an optical mask whereas the Gaussian image shape is readily available as a fundamental mode of laser sources.

The selection of image width size is dominated by the factors of processing time and noise attenuation. Attenuation of noise is facilitated by increasing the image width. In particular, because saturation is very common in optical systems due to surface reflectivity variations, it is desirable to have as large of an image size width as possible. On the other hand, image width in terms of number of diodes increases the signal processing time and therefore image widths of 2-3 photodiodes is desirable. As a practical compromise, an image width of 10-15 photodiodes is a reasonably optimal selection and preferably should not exceed a width of 5-20 diodes. Moreover, the standard deviation of the location estimator, that is, the location of the peak value of a cross correlation function, should not exceed a width of one diode and preferably should not exceed a width of 0.1 diode due to image noise. As used herein, "standard deviation" has the well-known meaning of the root of the mean squared error.

As previously discussed in connection with image shape criteria, spatial position estimation of an image is of substantial use in locating the image with a high degree of resolution over a wide displacement range. As used herein, the term "estimation" means the estimation of the location of the image of a light spot. Complicating the estimating procedure is the presence of noise, that is, distortions in the illumination that form an image and mask the actual shape of that image. Application of estimation theory in the present invention requires the use of a known ideal or theoretical desired image shape which preferably is substantially range independent and has the same shape and width and can be expressed by the same mathematical function as an actual image shape. Further required is an estimation algorithm which can be applied to the ideal and actual image shapes to calculate the algorithm function value of the two shapes and thereby spatially locate the actual image shape relative to the ideal or theoretical desired image shape. With reference to FIG. 7, there is shown a plot of a theoretical desired Gaussian image shape 54 which is plotted from a plurality of amplitude values in the Y axis direction taken along the X axis of the image shape. An actual Gaussian image shape 56, distorted by light signal noise and representing the light intensity distribution of the light spot image 8', is also shown at a position displaced from the theoretical desired image shape 54. The actual image shape 56 has amplitude values in the Y axis corresponding to each photodiode 20 in the photodiode array 14 on which the light spot image 8' is incident. The increment width of each amplitude of the actual image shape 56 is representative of the width of the diode producing the light image at that location. The cross correlation estimation algorithm is calculated from the values of these two image shapes to determine the spatial location of the actual image shape of the light spot image 8' and thereby the displacement of the work surface 2, as will be discussed in greater detail hereinafter.

The previous discussion of image shapes provided selection criteria relating to the attributes of the shapes for use in estimating the spatial location of an actual image shape. As previously mentioned, estimation algorithms that have potential use in spatially locating an actual light image shape include peak detection, centroid algorithm calculation, and the cross correlation algorithm. Of these, the cross correlation algorithm is preferred for the following reasons. The cross correlation algorithm utilizes knowledge of the shape of the light image in correlating the actual and theoretical desired image shapes, that is, in determining the spatial location at which the actual and theoretical desired image shapes coincide. In particular, the peak cross correlation algorithm also meets the requirements for estimation accuracy in that its function is unbiased, consistent and efficient. Briefly stated, the "unbiased" requirement means that the expected value of the algorithm function is equal to or at the actual value and the term "consistent" means that the algorithm function does in fact converge to the actual value with increasing sample size.

Algorithms other than the cross correlation algorithm that may be used for estimation purposes do not use all of the image shape information and therefore their repeatability is low, i.e., they are not consistent, and this prevents these algorithms from providing high resolution. It may be noted that high resolution cannot be obtained with low repeatability due to the failure of calculated location estimations to follow displacement of the surface in accord with the algorithm function. Since the cross correlation function does use all of the image shape information, it is highly repeatable and provides high resolution. "Efficiency" in a mathematical sense here means that the squared error of the difference between the calculated algorithm function and the actual value is as small as possible. The cross correlation function meets this requirement. In a scientific sense, "efficiency" means that all information is used in the algorithm estimation calculation. Since this is true of the cross correlation algorithm and is not the case for other estimation algorithms, the cross correlation algorithm is also efficient relative to other algorithms in a scientific sense.

The overall operation of the apparatus of the invention may be described as follows. The light beam 4 from the laser 6 is directed onto the work surface 2 at the spatially displaced position C to form the illuminated spot 8 on the surface 2. Light reflected from the surface 2 passes through and is imaged by the imaging lens 10 as illuminated spot 8' on the light receiving surface 15 of the photodiode array 14. The reflected light is preferably of a diffuse, scattered type, as opposed to specular in nature, due to the problem of diode saturation that tends to occur with intense specular light. Each diode 20 of the photodiode array, in response to receiving light energy, will generate a current signal proportional to the light energy which causes the transfer of a digital signal into a memory data base of the computer 28 by means of the charge transfer of the shift register 16, the integration of the charge to a voltage by the circuit 18, and the conversion of the analog voltage signal of the circuit 18 to a digital signal by the A/D converter 26.

Considering the light spot 8', as imaged on the photodiode array 14, to have a width of 0.020 inches or 20 diodes each 0.001 inches wide and a Gaussian intensity distribution image shape, the image shape 56 of the actual light spot image 8' in the form of a signal representation 56a-u comprising a plurality of signals each generated by a photodiode 20 and including various types of noise, appears in plotted form as shown in FIG. 7. In FIG. 7, the Y axis represents the image shape amplitude or light intensity and distance along the X axis represents displacement distance of the workpiece surface 2. The actual light spot image shape 56 is illustrated centered at displacement location C' and this spatial location on the X axis corresponds to spatial displacement location C of the surface 2 as shown in FIG. 1. The spatial location B' in FIG. 7 corresponds to the surface 2 displacement position B in FIG. 1.

The algorithm of the theoretical desired Gaussian image intensity distribution shape for calculating a plurality of discrete diode signals representative of the theoretical desired shape is also stored in the memory data base of the computer 28. In terms of the location of the theoretical desired image shape along the photodiode array 14, i.e., along the X axis of the plot of FIG. 7, the theoretical desired image shape may be calculated at any position at which an estimation of the actual image shape location is to be made. The diode signals preferably, at least for a coarse estimation of the actual image shape location, each are the width of one diode and together define a signal representation of the theoretical desired image intensity distribution shape. In FIG. 7, the shape 54 of a theoretical desired Gaussian intensity is illustrated as a dashed line superimposed on a diode signal representation 54a-u of the theoretical desired Gaussian intensity shape. The signal representation 54a-u is initially located at reference location A', corresponding to the reference null position A of the surface 2.

The cross correlation algorithm used in the present invention for estimating the spatial location of the actual image shape 56 relative to the location of the theoretical desired image shape 54 is:

$$R_{I_a,I_d}(S) = 1/L \cdot \int_0^L I_a(X_i) \cdot I_d(X_i - S) \cdot dX_i$$

$I_d$ is the theoretical desired image shape 54 amplitude as a function of displacement along the photodiode array 14,
$I_a$ is the actual image shape 56 amplitude as a function of displacement along the photodiode array 14,
L is the photodiode array 14 active length, and
$X_i, S$ are distances along the photodiode array 14.

It may be noted that an approach in which the maximum cross correlation function is calculated is preferred as opposed to calculating the cross correlation slope function to determine cross correlation values because of the ambiguity caused by the slope moving toward a zero value at the lateral extremes of the cross correlation function as well as at its peak value.

In applying the maximizing cross correlation function calculation, the numerical processing of the algorithm may be viewed as an iterative loop in which, at a selected test location, for example position A', each one of the representative diode signals 54a-u of the theoretical desired image shape 54 is multiplied by each corresponding representative signal of the signals 56a-u of the actual image shape 56. The resulting products are summed and the sum represents the cross correlation function value of the two image shapes at the test location A'. Further corresponding values of the 54a-u and 56a-u representative signals are multiplied at additional selected test locations and compared with prior values until the peak value of the cross correlation function is determined within the desired resolution. At this point, the estimation of the location of the actual image shape 56 is completed and the distance between the original test location of the desired image shape 54, at the reference location A' of 500 diodes on the X axis, and the test location corresponding to displacement point C' at 20 diodes on the X axis, is used to calculate the displacement between reference distance A and distance C as shown in FIG. 1. A signal representative of this estimated displacement of the surface 2 may be transferred to and indicated by an indication device 24 as shown in FIG. 2.

In determining the estimated location of the actual image shape 56, when the cross correlation function is at a peak value, the image shapes 54 and 56 will be superimposed or coincide with each other to the extent possible as shown by the coinciding location of the dashed line illustration of shape 54 in FIG. 7. When the cross correlation function is close to its peak value, a high degree of accuracy in locating the image shapes 54 and 56 in coincidence to each other and thereby a high level of resolution in determining the displacement of the work surface 2 can be obtained by calculating the cross correlation values at very small diode width increments. This is accomplished by moving the theoretical desired image shape 54 a fraction of a diode width, for example, 1/50th of a diode width. The value (amplitude) of each of the diode representative signals 54a-o at the 1/50th increment location is calculated and a value of the cross correlation function is calculated from the two image shapes at the 1/50th increment location. The theoretical desired image shape can continue to be incrementally stepped 1/50th of a diode width until the peak value of the cross correlation function is obtained to within this resolution. In effect, then, the peak value of the cross correlation function can be determined to an accuracy of 1/50th of a photodiode 20. It may be noted that the limit of the fractional diode resolution is determined by the image distortion. Thus, on some photodiode surfaces, better resolution is obtainable. Consequently, the displacement of the work surface 2 can be determined to a degree of resolution of 1/50th of a photodiode 20. Where the displacement measuring range between positions B and C (see FIG. 1) is 5 inches, the diode array contains 1000 diodes, each diode 20 is 0.001 inches wide and the surface 2 displacement can be located to an increment of 1/50th of a diode, the resolution is 0.0001 inches, and the range to resolution ratio of the optical probe is 50,000:1.

Figure 8:
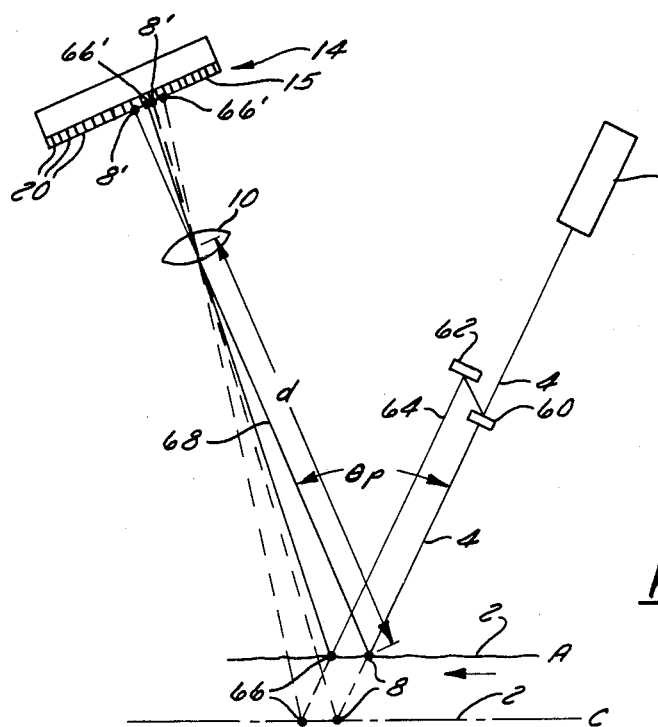
FIG. 8 illustrates schematically components of an alternate embodiment of the invention.
Figure 9:
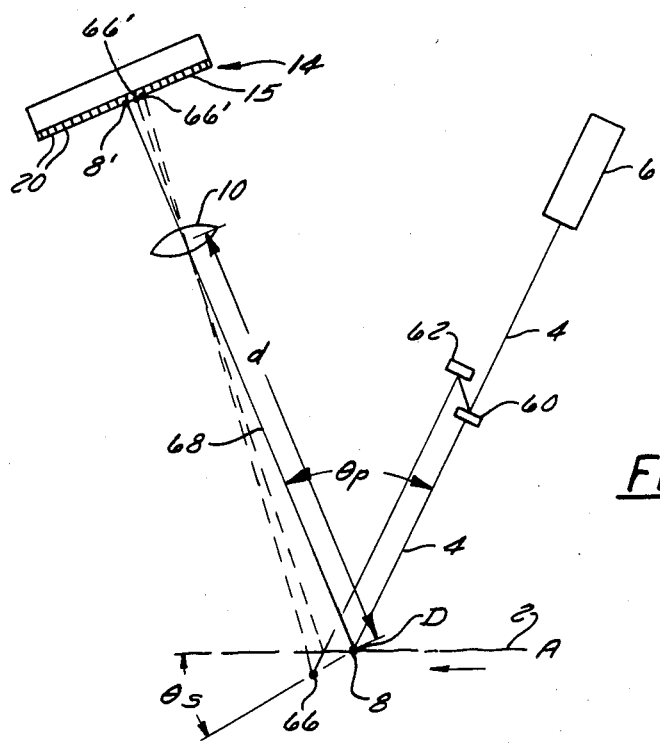
FIG. 9 illustrates schematically the embodiment of FIG. 8 in which a surface being measured is inclined.

In FIGS. 8 and 9, there is illustrated an alternate embodiment of the invention in which means are provided for estimating the inclination of the work surface 2. Simultaneously with the determining of the inclination of the surface 2, its displacement may also be determined. Components in FIGS. 8 and 9 which are similar to the components of the embodiment illustrated in FIGS. 1 through 7 are designated with the same identifying numerals. In FIGS. 8 and 9, the laser 6 produces a light beam 4 which is directed toward optical light dividing means 59 which includes a beam splitter 60 and a mirror 62. The beam splitter 60 passes a portion of the beam 4 and reflects a portion toward the mirror 62 which reflects a beam 64 parallel to beam 4 toward the workpiece surface 2. The beam 64 produces a light spot 66 on the surface 2 and the beam 4 produces a light spot 8 on the surface 2. The light spots 66 and 8 are in a probing plane defined by the beams 4 and 64 and the optical axis of the lens 10.

FIG. 8 illustrates the spacing between the light spot images 8' and 66' as imaged on the photodiode array 14 at the reference position A of the surface 2 and at a displacement of the surface 2 from reference position A to position C without any inclination of the surface 2. With the surface 2 at position C the images corresponding to 8' and 66' are respectively identified as 8'$_C$ and 66'$_C$. FIG. 9 illustrates the change in spacing between the light spot images 8' and 66' on the surface 2 as imaged on the photodiode array 14 when the surface 2 is inclined an angle $\phi_s$ to position D without any displacement of the surface 2 from the reference position A. In FIG. 9, the images at position C of the surface 2 corresponding to images 8' and 66' are designated 8'$_D$ and 66'$_D$. Note that the image 8' has not actually moved. FIG. 8 illustrates that the absolute position of the two spot images 8' and 66' on the diode array 14 is substantially dependent on the displacement of the entire surface 2 and that there is little change in the relative distance between the spot images 8' and 66' due to the displacement of the entire surface 2. FIG. 9 illustrates that the relative distance between the two spot images 8' and 66' on the photodiode array 14 is substantially dependent on the inclination angle $\phi_s$ of the surface 2.

The primary purpose of the inclination estimating embodiment of the invention is twofold. With knowledge of the surface inclination, the optical probe can be optically oriented perpendicular to the surface such that a maximum amount of light energy reaches the surface to thereby maximize the probe's signal to noise ratio. Further, where, for example, the surface is to have an operation performed upon it which requires a specific angular orientation relative to the inclination of the surface of the device performing the operation, the optical probe can provide the surface inclination information necessary. It may also be noted that where translational movement of the device performing the operation into proximity with the surface is required, the distance measuring ability of the optical probe can be utilized in providing direction and distance guidance.

Figure 10:
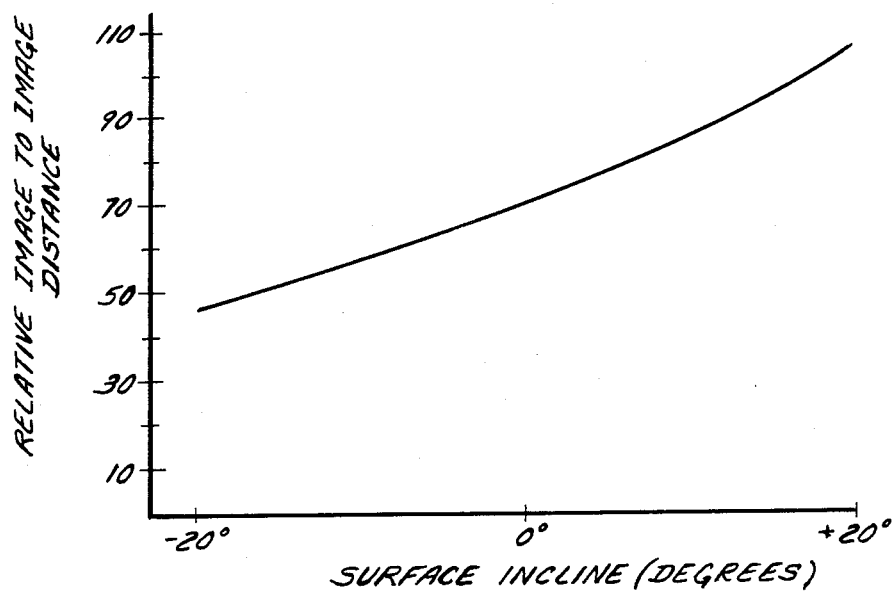
FIG. 10 illustrates a plotted curve of the relationship between light image displacement and surface inclination.

It has been experimentally found that where the deviation between relative positions of the spot images 8' and 66' on the photodiode array 14 of one diode for each degree of inclination of the surface 2 can be tolerated, the relative image-to-image distance with respect to surface inclination will be related as shown by the plot of the curve in FIG. 10, for suitable values of spacing between the beams 4 and 64, values of distance between the imaging lens 10 and the surface 2, and values of included angle $\theta_p$ between the beam 4 and the focal axis 68 of the imaging lens 10. With use of information underlying a curve such as that of FIG. 10 and knowledge of the spacing between the light spot images 8' and 66' on the photodiode array 14 at 0°, inclination of the surface 2 can be estimated and used as required for orientation of the probe or any other device. Using an approach based on precalculated data to estimate the inclination of the surface 2, requires that the data be stored in a data base comprising part of computer 28 (see FIG. 2). However, the inclination can also be calculated by the computer 28 from the estimated locations of the light spots 8 and 66 in their probing plane.

The image intensity distributions of both of the light spot images 8' and 66' on the photodiode array 14 can be processed by the circuit as shown in FIG. 2 with signal representations of both of the image intensity distribution shapes of light spot images 8' and 66' transferred to and stored in the computer 28. However, the computer 28 could also be programmed to locate the shapes of light spot images 8' and 66' by use of relatively simple peak detection means for purposes of estimating the distance between the light spots 88 and 66 on the surface 2 and determining the inclination of surface 2. On the other hand, if greater accuracy is desired in identifying the inclination of the surface 2, cross correlation estimation calculations can be made with respect to the image shapes of both light spot images 8' and 66' and the estimation of the inclination of the surface 2 can be made with the cross correlation location estimation. In such case, the cross correlation functions would be calculated respectively from the function light spot image 8' and theoretical desired image shape function, and the cross correlation function of light spot image 66' and a theoretical desired image shape function. Further, the calculations for the location estimation of the two spot images 8' and 66' and the determination of the surface inclination may be made at the same time as, that is, in parallel with, the cross correlation function calculations for the estimation of the location of the light spot image 8'. If a high level of accuracy in estimating the inclination of the surface 2 is desired, the light spot image shapes may have the same characteristics as discussed with respect to the embodiment of the invention illustrated in FIGS. 1–7.

Figure 11:
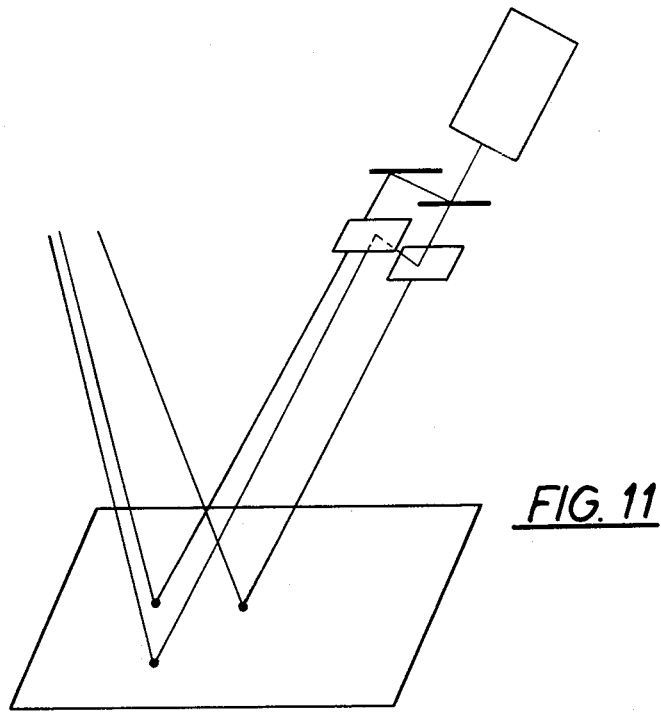
FIG. 11 illustrates schematically the components of a further alternate embodiment of the invention.

A further alternate embodiment of the invention relating to the embodiment shown in FIGS. 8 and 9 is illustrated in FIG. 11. The components of the apparatus illustrated in FIG. 11 which are similar to the components of the apparatus of FIGS. 8 and 9 are identified with corresponding numerals. The apparatus of FIG. 11 provides a third parallel beam for determining inclination of the surface 2 where inclination of the surface varies substantially in a plane perpendicular to the two beam probing plane of the apparatus of FIGS. 8 and 9. In FIG. 11, a light dividing means 69 includes beam splitters 78 and 76 and mirrors 72 and 70. The light beam 4 passes through the mirror 70 which reflects a portion of the beam 4 to mirror 72 which, in turn, reflects a light beam 74 parallel to beam 4 toward surface 2. A portion of the beam 4 from the laser 6 passes through the beam splitter 70 to a second mirror 76. A further portion of the beam 4 then passes through the beam splitter 76 toward the surface 2 and a portion of the beam 4 is reflected from the beam splitter 76 to a second beam splitter 78 which reflects the light beam 80 parallel to beams 74 and 4 toward the surface 2. The light spots 8, 66 and 82 formed on the surface 2 respectively by the beams 4, 74 and 80. The light spots 8 and 66 are positioned such that they lie in a probing plane defined by beams 4 and 74 and the optical axis of lens 10 and parallel to the direction of movement of the work surface 2. A probing plane perpendicular to the first probing plane is defined by beams 4 and 80 and the optical axis of lens 10 and the light spots 8 and 82 lie in it. A light spot such as light spot 8 may be common to two pairs of light spots lying in different probing planes. A two dimensional photodiode array 86 is provided such that light spot image pair 8' and 66' have the same spatial relationship as in the embodiments of FIGS. 8 and 9 on the photodiode array 86 and the light spot image pair 8' and 82' have a similar spatial relationship but in a direction perpendicular to that of the probe between spot images 8' and 66'. The processing of the representative signals from the photodiode array 86 to determine the spacing between spot images 8' and 66' and between 8' and 82' and the determination of the correction to the estimated location of the image shapes in computer 28 is accomplished in substantially the same manner as in the embodiment of the invention illustrated in FIGS. 8 and 9.

It will be understood that the foregoing description of the present invention is for purposes of illustration only and that the invention is susceptible to a number of modifications or changes, none of which entail any departure from the spirit and scope of the present invention as defined in the hereto appended claims. For example, it is preferable that the reference image shape be a theoretical image shape, however, a reference image shape obtained from the light source comprising part of optical probe may also be used.

What is claimed is:

1. In an optical triangulation probe apparatus for measuring the distance of a surface utilizing light reflected from the surface and including a light source projecting a beam of light toward the surface, the combination comprising:
    an actual light spot image having a predetermined known image intensity distribution shape and formed from the light reflected from the surface;
    detector means for receiving the actual light spot image and producing a plurality of signals representative of the image intensity distribution of the actual light spot image shape and the location of the image on the detector means, the position of the actual light spot on the detector means having a known relationship to the distance of the surface; and
    estimating means containing a signal representation of a theoretical reference light spot image intensity shape and the spatial location of the theoretical reference light spot image for receiving the plurality of signals representative of the intensity distribution of the actual light spot image shape and estimating the spatial location of said plurality of signals representative of the intensity distribution of the actual light spot image coinciding with the signal representation of the theoretical reference light spot image shape whereby the surface distance is measured due to the known relationship between the position of the actual light spot image and the distance of the surface.

2. The apparatus according to claim 1 wherein the sizes of the actual light spot image shape and the theoretical light spot image shape are substantially equal.

3. The apparatus according to claim 1 or 2 wherein the actual light spot image shape and the theoretical desired light spot image shape have the same image function.

4. The apparatus according to claim 3 wherein the actual light spot image shape on the detector means is substantially constant in size.

5. In an optical triangulation probe apparatus for measuring the displacement of a surface from a reference position utilizing light reflected from the surface and including a light source projecting a beam of light toward the surface, the combination comprising:
    an actual light spot image having a predetermined known image intensity distribution shape and formed from the light reflected from the surface;
    detector means for receiving the actual light spot image and producing a signal representation of both the intensity distribution of the image shape of the actual light spot image and the position on the detector means at which the actual light spot image is received;
    a data base containing a signal representation of both the intensity distribution of a theoretical desired light spot image shape and a reference spatial location of the theoretical light image shape corresponding to the reference position of said surface; and
    estimating means receiving the signal representation of the intensity distribution of the theoretical desired light spot image shape and its spatial location and the signal representation of the intensity distribution of the actual light spot image shape for calculating the cross correlation function of said signal representations at the reference location of the theoretical desired image shape and at additional spatial locations of the theoretical desired light image shape until an estimation of the peak value of the cross correlation function is obtained; and
    means for identifying the distance between the reference spatial location at which the initial cross correlation function is calculated and the spatial location at which the peak value of the cross correlation function is calculated, said distance being representative of the displacement of said surface from the reference position.

6. The apparatus according to claim 5 wherein:
    the detector means comprises a plurality of juxtaposed photodiodes each receiving a portion of the actual light spot image and producing a signal comprising a part of the signal representation of the image intensity distribution of the actual light spot image, said signal having a width of one photodiode; and
    the actual light spot image has an image width in terms of diodes such that the standard deviation of the location estimator due to image noise does not exceed 1.0 diode.

7. The apparatus according to claim 6 wherein the image width of the actual light spot is such that the standard deviation of the location estimator does not exceed 0.1 diode.

8. The apparatus according to claim 6 or 7 wherein the image width of the actual light spot image is in the range of 5 to 20 diodes.

9. The apparatus according to claim 6 wherein the theoretical desired light spot image and the actual light spot image both have shapes such that the cross correlation function of the two image shapes is unimodal in character.

10. The apparatus according to claim 5 or 9 wherein the theoretical desired light spot image and the actual light spot image both have shapes such that the peak value of the cross correlation function of the two image shapes is uniquely identified.

11. The apparatus according to claim 5 wherein both the theoretical desired light spot image and the actual light spot image have Gaussian image shape.

12. The apparatus according to claim 5 further comprising indicating means responsive to the identifying means for indicating the displacement of the surface from its reference position.

13. The apparatus according to claim 5 wherein the beam of light is collimated such that the size of the actual light spot image on the detector means is independent of the position of the surface.

14. The apparatus according to claim 5 or 13 wherein the actual light spot image shape on the detector means is substantially constant in size.

15. The apparatus according to claim 5 wherein the sizes of the actual light spot image shape and the theoretical desired light spot image shape are substantially equal.

16. The apparatus according to claim 5 or 15 wherein the actual light spot image shape and the theoretical desired light spot image shape have the same image shape function.

17. A method utilizing light for locating the position of a surface comprising the steps of:
projecting an actual light spot having a predetermined known image intensity distribution shape onto said surface;
reflecting light from the surface to form an actual image of the light spot on a light detector means at a location on the detector means having a known relationship to the position of the surface;
producing a plurality of signals with the detector means representative of the intensity distribution of the actual light spot image on the light detector means and indicative of the spatial location of the actual image on the detector means;
generating a plurality of signals representative of the intensity distribution of a theoretical desired light spot image shape; and
calculating the cross correlation function of the two light spot image shapes from their representative signals at a spatial reference location of the theoretical desired light spot image shape relative to said actual light spot image spatial location and at additional closer locations of the two image shapes until the peak value of the cross correlation function is calculated to determine the spatial location of the actual light spot image relative to the reference location of the theoretical desired light spot image whereby the position of the surface is established due to the known relationship between the spatial location of the actual light spot image on the light detector means and the position of the surface.

18. The method according to claim 17 further comprising the step of indicating the position of the surface.

19. The method according to claim 17 wherein the cross correlation function calculation is accomplished by calculating a unimodal cross correlation function.

20. The method according to claim 17 or 19 wherein the step of projecting an actual light spot onto the surface is accomplished by projecting a light spot having an image that contributes to the unimodal character of a cross correlation function calculated with the use of the actual image shape.

21. The method according to claim 20 wherein the step of generating a plurality of signals is accomplished by generating a plurality of signals representative of the intensity distribution of a theoretical desired light spot image shape that contributes to the unimodal character of a cross correlation function calculated with the use of the theoretical desired image shape.

22. The method according to claim 17, 18, 19, or 21 wherein the light detector means comprises an array of photodiodes, and the step of calculating the cross correlation function is accomplished by initially making calculations at spatial intervals corresponding to the widths of individual photodiodes and, when calculated cross correlation values approach a peak value, making further calculations at spatial intervals less than the width of each photodiode.

23. The method according to claim 17 wherein the steps of projecting a light spot onto said surface and generating a plurality of signals is accomplished by projecting a light spot onto the surface having a Gaussian image intensity distribution shape and generating a plurality of signals representative of a Gaussian image intensity distribution shape.

24. The method according to claim 17 wherein the steps of projecting a light spot onto said surface and generating a plurality of signals are respectively accomplished by projecting a light spot onto the surface having an image intensity distribution shape function that is recursive in form and generating a plurality of signals representative of an image intensity distribution shape function that is recursive in form.

25. A method utilizing light for locating the position of a surface comprising the steps of:
projecting onto the surface an actual light spot having an image intensity distribution shape that contributes to the unimodal character of a cross correlation function calculated with the use of the image shape;
reflecting light from the surface to form an actual image of the light spot on a light detector means at a location on the detector means having a known relationship to the position of the surface;
producing a plurality of signals with the detector means representative of the intensity distribution of the actual light spot image shape on the detector means and indicative of the spatial location of the actual image on the detector means;
generating a plurality of signals representative of the intensity distribution of a reference light spot image shape; and
calculating a unimodal cross correlation function of the two light spot image shapes from their representative signals at a spatial reference location of the reference light spot image shape relative to the actual light spot image spatial location and at additional closer relative locations of the two image shapes until the peak value of the cross correlation function is calculated;
determining the location of the actual light spot image shape relative to the spatial reference location of the reference light spot image shape using the location of the reference light spot image shape when the peak value of the cross correlation is calculated and the spatial reference location of the reference light spot image shape; and indicating the position of the surface using the known relationship between the location of the actual light spot image shape as determined and the position of the surface.

26. The method according to claim 25 wherein the step of generating a plurality of signals is accomplished by generating a plurality of signals representative of the intensity distribution of a reference light spot image shape that contributes to the unimodal character of a cross correlation function calculated with the use of the reference image shape.

27. The method according to claim 25 wherein the step of generating a plurality of signals is accomplished by generating a plurality of signals representative of the intensity distribution of a theoretical desired light spot image shape that contributes to the unimodal character of a cross correlation function calculated with the use of the theoretical desired image shape.

28. A method utilizing light for locating the position of a surface comprising the steps of:
projecting onto the surface a light spot having an image intensity distribution shape that contributes to the unique identification of the peak value of a cross correlation function calculated with the use of of the function of the light spot image shape;
reflecting light from the surface to form an actual image of the light spot on a light detector means at a location on the detector means having a known relationship to the position of the surface;
producing a plurality of signals with the detector means representative of the intensity distribution of the actual light spot image shape on the detector means and indicating the spatial location of the actual image on the detector means;
generating a plurality of signals representative of the intensity distribution of a reference light spot image shape that contributes to the unique identification of the peak value of a cross correlation function calculated with the use of said representative signals; and
calculating the cross correlation function of the two light spot image shapes from their representative signals at a spatial reference location of the reference light spot image shape relative to the actual light spot image spatial location and at additional closer relative locations of the two image shapes until the peak value of the cross correlation function is calculated to determine the location of the actual light spot image relative to the reference location of the reference light spot image whereby the position of the surface is located due to the known relationship between the spatial location of the actual light spot image on the light detection means and the position of the surface.

29. In an optical probe apparatus for measuring the angle of inclination of a surface and including a light source, the combination comprising:
optical means producing from the light source a plurality of parallel light beams and directing the light beams toward the surface to form a plurality of light spots each corresponding to a light beam;
detector means on which an actual image of each of said light spots is formed by light reflected from the surface for producing a signal representation of the location of each of the actual light spot image shapes on the detector means, the positions of each of the actual light spot images on the detector means having a known relationship to the distance of the surface from the probe and the inclination of the surface such that each of the light spots on the surface can be uniquely spatially located; and
estimating means receiving said signal representations for determining from the signal representations the spatial location of the light spots on the surface and the inclination of the surface.

30. The apparatus according to claim 29 wherein the estimating means comprises computer means for calculating the inclination of the surface from the signal representations 31. The apparatus according to claim 29 wherein the estimating means comprises a data base containing a stored signal representation of the relationship between the inclination of the surface and the distance on the detector means between predetermined pairs of actual light spot images, the predetermined pairs of actual light spot images corresponding to those pair of light spots between which it is desired to determine the inclination of the surface, whereby the estimating means can estimate the inclination of the surface by use of the data base.

32. The apparatus according to claim 29 further comprising:
a data base containing a reference signal representation of both the intensity distribution of a reference light spot image shape and a reference spatial location corresponding to the distance of the surface from the probe; and wherein
the estimating means receives the reference signal representation and calculates the cross correlation function of the reference signal representation and the signal representation of one of the actual light spot images at said reference location and at additional spatial locations of the reference light spot image shape until an estimate of the peak value of the cross correlation function is obtained, the distance between the reference signal representation at its reference location and its location when said peak value is calculated being an estimate of the location of the actual light spot image shape, and therefore the distance of the surface from the probe due to the known relationship between the position of the actual light spot images and the distance of the surface from the probe.

33. The apparatus according to claim 32 wherein:
the reference light spot image shape is a theoretical desired light spot image shape; and
the actual light spot shapes each have a predetermined known image shape.

34. The apparatus accordinf to claim 33 wherein the estimating means calculates the cross correlation function of the theoretical desired signal representation and the signal representation of a second one of the actual light spot image shapes at said reference location and at additional spatial locations of the theoretical desired light spot image shape until an estimate of the peak value of the cross correlation function is obtained with respect to the second actual light spot image shape, the distance between the reference singal representation at its reference location and its location when the peak value related to the second actual light spot image shape is calculated being an estimate of the location of the second actual light spot image shape, the distance between the locations of the second actual light spot image shpae and said one actual light spot image shape on the detector means being an estimate of the inclination of the surface due to the known relationship between the positions of each of the light spot image shapes and the inclination of the surface.

35. The apparatus according to claim 33 wherein the theoretical desired light spot image shape and the actual light spot image shape both are such that they contribute to a unimodal character of the cross correlation function.

36. The apparatus according to claim 29, 30, 31, 32, 33, 34 or 35, wherein each of said parallel light beams are collimated, such that the size of the actual light spot image on the detector means is independent of the distance of the surface from the probe.

37. The apparatus according to claim 29, 30, 31, 32, 33, 34, or 35, wherein the sizes of the actual light spot image shape and the reference light spot image shape are substantially equal.

38. The apparatus according to claim 29, 30, 31, 32, 33, 34 or 35, wherein the actual light spot image shape and the reference light spot image shape have the same image shape function.

39. The apparatus according to claim 29 further comprising:
an imaging lens having an opticl axis, the optical axis and a first pair of the plurality of beams being positioned such that the pair of beam intersect the optical axis and define a first probing plane, inclination of the surface occurring in the first probing plane; and
the receiving surface of the detector means is aligned in the probing plane.

40. The apparatus according to claim 39 wherein:
a second pair of said plurality of beams define a second different probing plane, inclination of the surface occurring in the second probing plane.

41. A method, utilizing a light source for locating the position and inclination of a surface comprising the steps of:
producing from the light source a plurality of parallel light beams having a predetermined known image intensity distribution shape and directing the light beams toward the surface to form a plurality of light spots each corresponding to a light beam and having said predetermined known image intensity distribution shape;
reflecting light from the surface to form a plurality of actual light spot image shapes each having said predetermined known image intensity distribution shape on a light detector means at locations on the detector means each having a known relationship to the inclination of the surface and to the distance of the surface from a reference position;
producing signal representation with the detector means of the intensity distribution of each of the plurality of actual light spot image shapes and indicative of the spatial location of the actual light spot image shapes on the detector means;
generating a signal representation of the intensity distribution of a theoretical desired light spot image shape;
calculating from their signal representations the cross correlation function of the theoretical desired image shape and the first one of a pair of actual light spot image shapes and the cross correlation function of the theoretical desired image shape and the second one of said pair of actual light spot image shapes at a spatial reference location and at additional closer locations of the theoretical desired light spot image shape relative to the actual light spot image shape spatial locations of each one of the pair of actual light spot image shapes until the peak value of the cross correlation function is calculated for each of the pair of actual light spot image shapes to determine the spatial location of each of the pair of actual light spot image shapes relative to the reference location of the theoretical light spot images whereby the position and inclination of the surface is established due to the known relationship between the locations of the pair of actual light spot image shapes on the light detector means and the position and inclination of the surface.

42. The method according to claim 41 in which, in the steps of calculating the two cross correlation functions, the calculation of the functions is performed simultaneously.

43. The method according to claim 41 wherein;
the step of calculating the two cross correlation functions is accomplished with a pair of actual light spot image shapes which have their corresponding light spots located in a first plate; and further comprising the step of performing said step of calculating the two cross correlation functions using a second pair of actual light spot image shapes located in a second different plane.

44. The method according to claim 43 wherein the first and second pair of actual light spot image shapes have one common light spot image shape.

45. In an optical probe apparatus for measuring the angle of inclination of a surface and including a light source producing a beam of light, the combination comprising:
optical means positioned in the path of the beam of light for dividing the beam of light into two parallel light beams and directing the two parallel light beams toward the surface to form two actual light spots on the surface and cause light to reflect from the surface;
detector means having a reflected light receiving surface on which an image of each of the two light spots is formed for producing a signal representation of the location of each of the light spot images on the detector means, the positions of the two light spot images on the detector means having a known relationship to the distance of the surface from the probe and the inclination of the surface such that each of the light spots on the surface can be uniquely spatially located; and
means receiving said signal representations for determining from the signal representation the spatial location of the light spots on the surface and the inclination of the surface.

* * * * *